United States Patent [19]

Grady et al.

[11] 4,253,636

[45] Mar. 3, 1981

[54] CONCRETE MOLDING MACHINE

[76] Inventors: Clyde C. Grady, Rte. 2, Box 155, Cabot, Ark. 72023; Clyde C. Grady, II, 9771 Jefferson Hwy., Apt. 20, Baton Rouge, La. 70809

[21] Appl. No.: 3,723

[22] Filed: Jan. 15, 1979

[51] Int. Cl.³ .......... B28B 7/18; B29C 3/00; B29C 3/02

[52] U.S. Cl. .......... 249/139; 249/142; 249/161; 249/163; 249/164; 249/167; 249/177; 425/451.9

[58] Field of Search .......... 249/161, 162, 163, 139, 249/167, 164, 219; 425/451.9

[56] References Cited

U.S. PATENT DOCUMENTS

| | | | |
|---|---|---|---|
| 25,626 | 10/1859 | Buckwalter | 249/161 |
| 247,502 | 9/1881 | Koeppe | 249/161 |
| 777,557 | 12/1904 | Stewart | 249/162 |
| 779,775 | 1/1905 | Evenstad | 249/161 |
| 783,299 | 2/1905 | McDowell | 249/162 |
| 785,272 | 3/1905 | Robbins | 249/161 |
| 812,336 | 2/1906 | Glatfelter | 249/162 |
| 822,039 | 5/1906 | Besser | 249/162 |
| 838,490 | 12/1906 | Wright | 249/161 |
| 857,977 | 6/1907 | Brock | 249/161 |
| 874,366 | 12/1907 | Layfield et al. | 249/161 |
| 1,457,767 | 6/1923 | Carey | 249/161 |
| 1,532,924 | 4/1925 | Nelson | 249/163 |
| 2,705,851 | 4/1955 | Dverr | 249/164 |
| 3,057,034 | 10/1962 | Helmick | 249/219 R |
| 3,642,400 | 2/1972 | Theodorsen | 249/162 |

*Primary Examiner*—John C. Bleutge
*Assistant Examiner*—Arthur H. Koeckert

[57] ABSTRACT

A molding machine is disclosed which can be used in the manufacture of concrete building elements. A method for the molding of concrete modular units using the disclosed concrete molding machine is also provided. The molding machine is constructed of vertical walls joined to form a single outer frame which is moveable up and down by means of expandable joints such as pneumatic or hydraulic cylinders which allow positioning and vibration of the outer frame. To said outer frame are attached horizontally expandable joints which support at least two mold sides which can be placed in abutment by the action of the expandable joints so as to form the continuous sides of a mold. The bottom side of the sequentially assembled mold is provided by a metal plate to which the aforesaid sides are lowered or attached. Detachment of the mold sides from the said outer frame as a unit allows support of the uncured concrete by the mold sides as an assembled mold during subsequent transport from the molding machine to curing ovens. The outer frame may then be used to assemble another set of mold sides immediately and is not prevented from use until the cementitious material which filled a prior set of mold sides cures sufficiently for the removal of the mold sides Provision is also made for the support of articles to be cast internally in the building elements by means of members attached at one end to the vertical walls of said outer frame, wherein the members may be extended horizontally thru apertures in the mold sides to within the confines of the various molds by a means of expansion and contraction which forms an integral part of the said members.

3 Claims, 1 Drawing Figure

CONCRETE MOLDING MACHINE

BACKGROUND OF THE INVENTION

Figure 1:
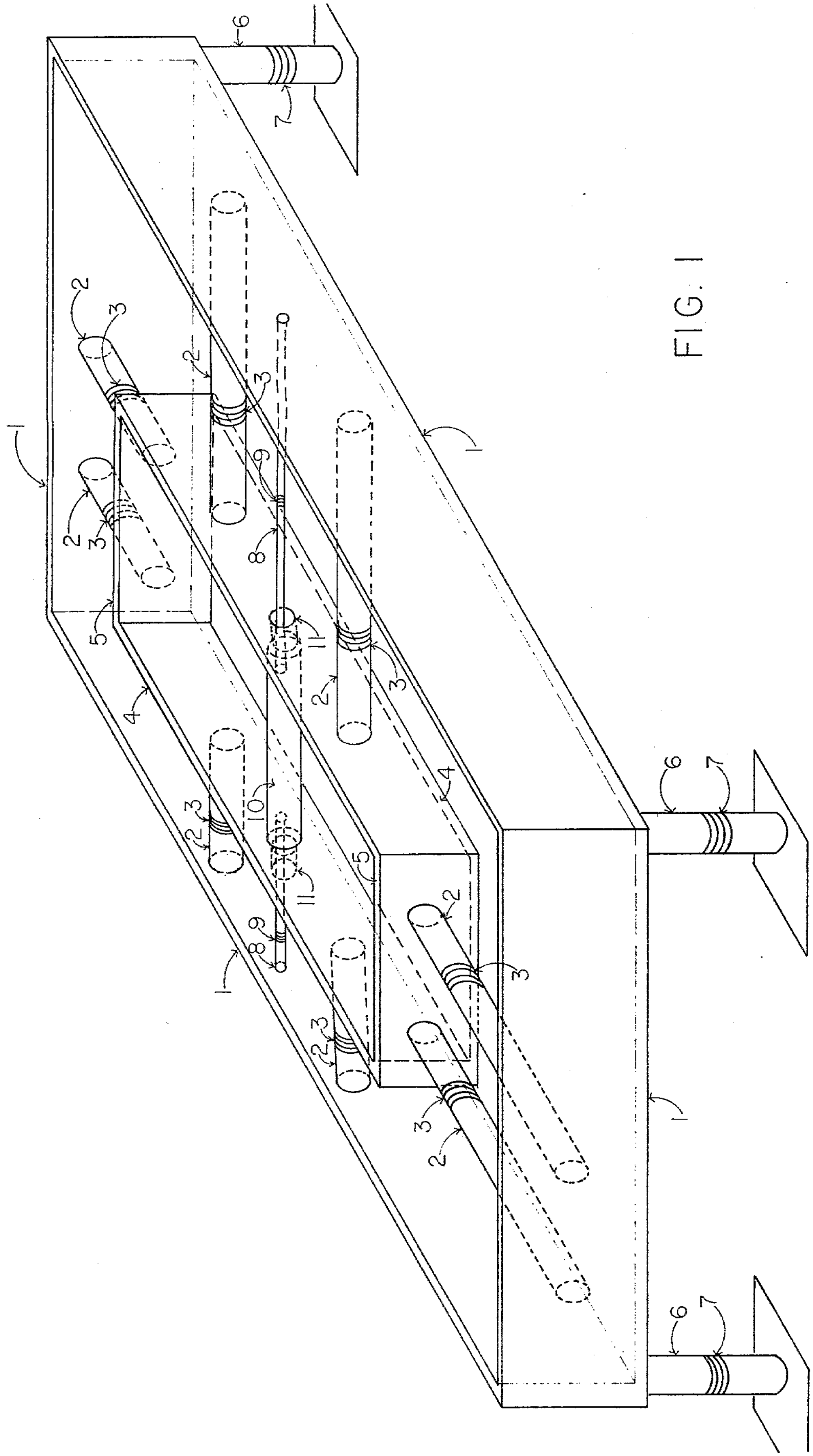

It is now common practice in the concrete or cementitious products industry to mold articles such as concrete blocks on various machines.

In these machines a mold of fixed dimensions is filled with concrete and then the mold is vibrated. Once compacted by the vibration, the molded article is pushed vertically downward out of the bottom of the mold having four walls which are fixed and immovable relative to one another.

So configured, these machines do not allow for a fast change in the dimensions of the article being molded. These machines and molds also require that the vertical sides of the article being molded be smooth and substantially vertical so that the molded article may be pushed downward out of the mold after compaction.

These machines of the art also do not allow for the inclusion of hollow members in a specified position in the molded concrete or cementitious article.

The object of the present invention is to remedy these shortcomings of the present art.

DRAWING DESCRIPTION

In FIG. 1 outer frame, 1, is supported by four pedestals, 6, which by means of expandable joints, 7, can be raised and lowered vertically. Horizontal arms, 2, connect the frame, 1, to the longer sides, 4, and shorter sides, 5, of the mold. Expandable joints, 3, of all eight horizontal arms, 2, allow the sides of the mold to be retracted thereby freeing them from the molded article.

The molding cycle of the machine consists of lowering frame, 1, by means of expandable joints, 7, with expandable joints, 3, expanded so that sides 4 and 5 abut one another and rest on a steel plate, not shown, forming a rectangular mold open only at its upper surface.

Tube, 10, may then be lowered between the sides, 4, as shown in FIG. 1. Then tube supporting members, 8, are extended by means of expandable joints, 9, through holes, 11, in sides, 4. The tube, 10, is thus firmly held in place by tube supporting members, 8.

Concrete or other cementitious material is thereby introduced into the mold through the open upper surface of the rectangular mold. The mold and frame, 1, are then vibrated to release air from the concrete and compact it.

Tube supporting members, 8, are then retracted by means of expandable joints, 9, through holes, 11, in sides 4 of the mold.

Sides 4 and 5 of the mold are then retracted toward the outer frame, 1, by means of expandable joints, 3, in support arms, 2. Outer frame, 1, is then raised by means of expandable joints, 7, in supporting pedestals, 6. The molded concrete article is then transported to curing ovens on the metal plate which formed the bottom of the mold.

Alternatively, sides 4 and 5 may remain with the molded article and the bottom plate of the mold during transport to curing ovens and during the subsequent curing, if before retraction of supporting arms, 2, sides 4 and 5 are disengaged from said supporting arms.

It is also within the scope of the invention, that instead of lowering frame 1 and sides 4 and 5 onto a steel plate, the steel plate may be raised to contact the lower edges of sides 4 and 5 to form the bottom of the mold.

What is claimed is:

1. A machine for making cementitious products comprising an outer frame enclosing a space and having upright sides, said frame being supported on pedestals such that a bottom plate may be brought into contact with the mold sections, mold sections for forming the side walls of the product, and substantially horizontal support arms each attached to the outer frame and supporting a mold section in the enclosed space, said support arms being capable of extension and retraction whereby the mold sections may be assembled and disassembled.

2. The machine of claim 1 wherein the mold sections are detachable from the horizontal support arms.

3. The machine of claim 1 further comprising at least one support member attached to the outer frame and adapted to extend through an aperture in a mold section whereby articles may be supported within the assembled mold during casting.

* * * * *